United States Patent [19]

Takaoka et al.

[11] 4,138,775
[45] Feb. 13, 1979

[54] METHOD FOR MANUFACTURING A SHOE FOR A SWASH-PLATE TYPE COMPRESSOR

[75] Inventors: Hikaru Takaoka, Kariya; Teruaki Inoshita, Toyota; Takashi Fukuda, Toyota; Hitoshi Toga, Toyota, all of Japan

[73] Assignees: Kabushiki Kaisha Toyoda Jidoshokki Seisakusho, Kariya; Taihou Kogyo Kabushiki Kaisha, Toyota, both of Japan

[21] Appl. No.: 815,427

[22] Filed: Jul. 13, 1977

[30] Foreign Application Priority Data

Apr. 19, 1977 [JP] Japan ............................ 52-044807

[51] Int. Cl.$^2$ ............................................. B23P 15/00
[52] U.S. Cl. ........................... 29/156.4 R; 29/149.5 B
[58] Field of Search ................ 29/445, 149.5 B, 156.4, 29/156.4 WL, 238, 441 R, 520, 525, 530; 92/71; 91/499; 417/269; 308/237 R, 239

[56] References Cited

U.S. PATENT DOCUMENTS

| | | | |
|---|---|---|---|
| 1,322,245 | 11/1919 | Klassen | 29/156.4 WL |
| 1,679,772 | 8/1928 | Johnson | 308/239 |
| 3,559,265 | 2/1971 | Noris et al. | 29/441 X |
| 3,785,751 | 1/1974 | Nemoto et al. | 92/71 X |

Primary Examiner—Michael J. Keenan
Attorney, Agent, or Firm—Browdy and Neimark

[57] ABSTRACT

A method for manufacturing a shoe for use, in a swash-plate type compressor, which shoe is to be inserted between a swash-plate and a ball for transmitting the motive power of the swash-plate to the piston related, wherein (1) a base material from which the shoe is made, is composed of steel and is on one side provided with a concavity having an annular groove inside; (2) an annular material of copper or other like metal, free from seizure when pressed against steel is put in the concavity before a male die with a projection of semispherical surface configuration is pressed thereinto; and (3) the concavity in the base material will then be deformed into a desired approximately semispherical configuration, while the annular material is spread under pressure between the projection and the base material of the shoe to cover the surface of the concavity to form a spherically deformed concavity. Shoes made in this way are highly resistant to high-speed operation, heavy-load, and impact. They are furthermore, extremely economical in manufacturing, and free from seizure or abnormal wearing even in case of a lubrication shortage.

10 Claims, 11 Drawing Figures

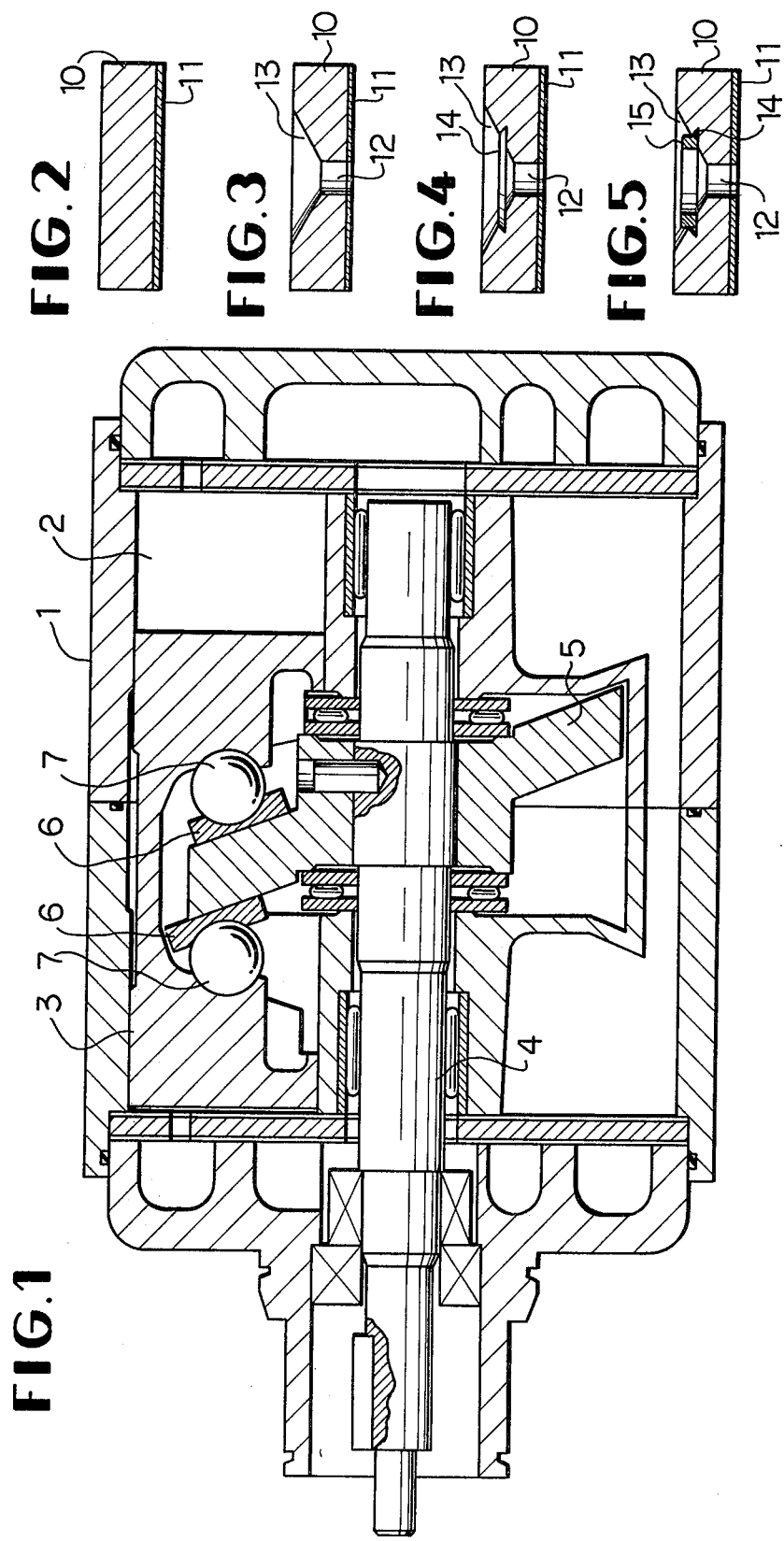

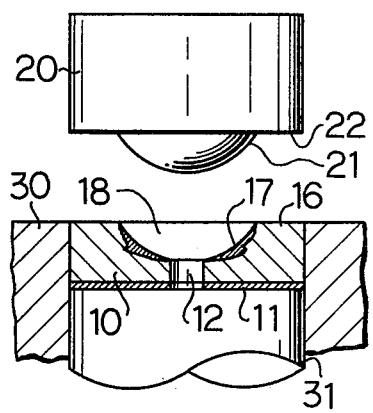
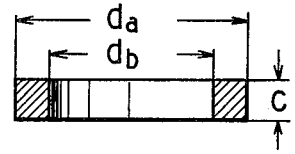
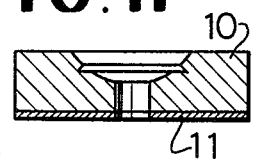
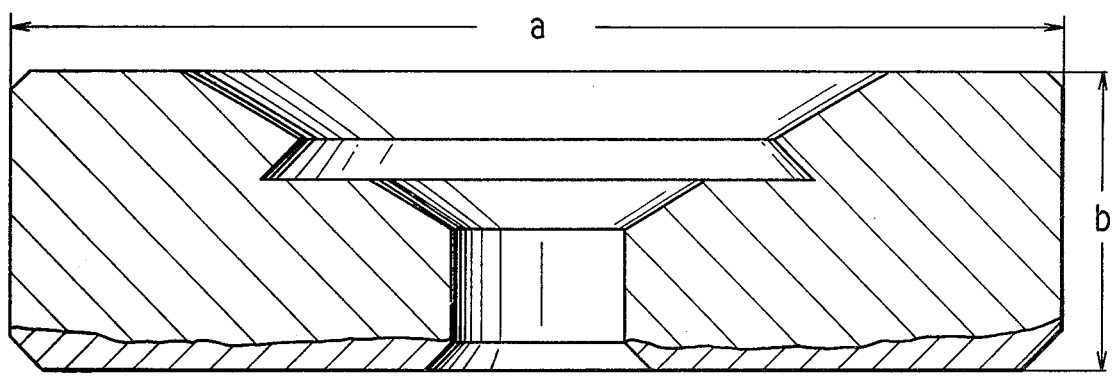
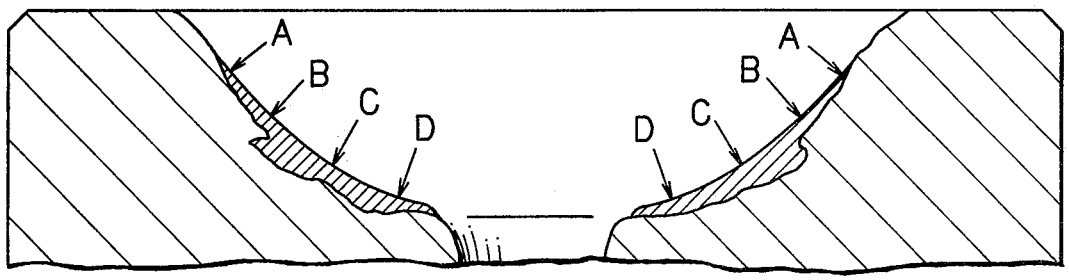
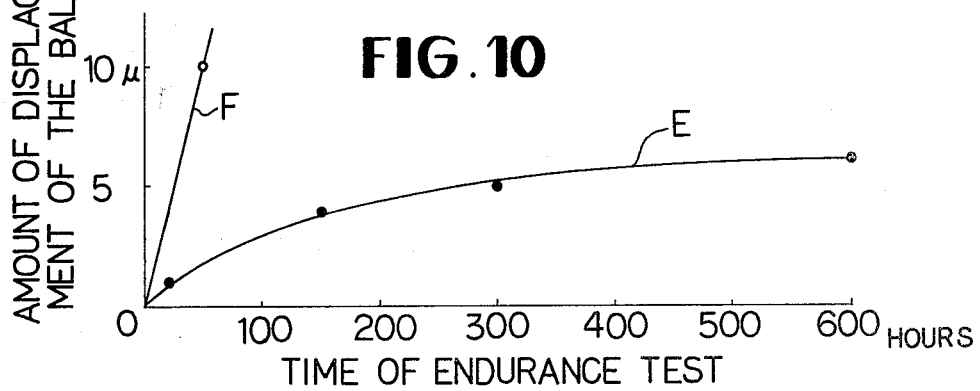

METHOD FOR MANUFACTURING A SHOE FOR A SWASH-PLATE TYPE COMPRESSOR

BACKGROUND OF THE INVENTION

This invention relates to a method for manufacturing a shoe for a swash-plate type compressor, more particularly, to a method for manufacturing a shoe which is to be inserted between a swash-plate and a ball for transmitting the thrust or motive power from the swash-plate to the piston in relation.

A swash-plate type compressor is used for compressing a gas by means of reciprocating a certain number of pistons, each of which is slidably fitted in a cylinder block, with the help of a rotating swash-plate. The power transmission from the swash-plate to the piston is, in general, carried out through the intermediary of the shoe and the ball. Between the shoe and the swash-plate there is produced, while the compressor is in operation, a severe pressing and sliding, and at the same time, a fairly strong thrust as well as a slide are effected between the shoe and the ball.

As the material for the shoe, aluminum-silicon alloys, copper, copper alloys, etc. have conventionally been employed. Aluminum-silicon alloys are not only weak in resistance to high-speed sliding, high-degree of load, and impact, but also unsatisfactory for their low efficiency in production thereof. On the other hand, copper and copper alloys are defective because they are expensive in the material cost.

A way of manufacturing a shoe, economical and durable, from steel was then attempted. A steel shoe is, however, liable to be seized by the ball or the swash-plate, or abnormally worn while in operation, since both the ball and the swash-plate are generally made of steel, the steel-to-steel contact is responsible for this effect. As a way of partly solving this problem the applicants have invented a method of making a shoe which has a layer of sintered alloy of the copper family formed on the contact surface with the swash-plate, which invention was filed as an application alloted a U.S. Ser. No. 615,888, now U.S. Pat. No. 4,037,552. Regarding the sliding surface between the shoe and the ball, the difficulty previously remained unsolved, no satisfactory technique being found in the prior art. Forming a layer sintered with powdered metal on the slide-contacting surface of the shoe concavity contacting the ball, similar to the contacting surface of the swash-plate, is not only technically difficult because of the spherical configuration of the concavity surface but also extremely expensive in its production cost. The plating of copper or a like metal on the slide-contacting surface with the ball of the shoe concavity, as an alternative method, requires a considerable amount of time and a high cost for obtaining a layer of sufficient thickness capable of preventing exposure of the steel base material to the ball, due to the fast wearing out of the layer.

SUMMARY OF THE INVENTION

It is therefore a primary object of this invention to provide a novel and economical method for manufacturing a shoe, eliminating the disadvantages of the prior art, which is capable of avoiding the seizure with the ball and the abnormally rapid wearing on the slide-contacting surface with the ball during the high-speed operation, regardless of its base material being steel.

It is another object of this invention to provide a method of fixing, or covering in such a manner as to resist delamination, on the slide-contacting surface of the shoe with the ball, a layer of a material substantially free from being seized by the steel, in sufficient thickness.

It is still another object of this invention to provide a method for simultaneously forming a concavity of spherical configuration, which is the slide-contacting surface between the shoe and the ball, and forming a covering layer to cover the inside surface of the shoe concavity.

The shoe manufacturing method in accordance with this invention, which will be apparent from the above-mentioned and the later stated detailed description, is characterized in comprising at least the following steps:

(a) forming an axially symmetrical concavity, on one of the surface of the base material of steel, the diameter of which progressively decreases from the opening portion of the concavity toward the bottom portion, and at least one annular groove formed on the concavity surface;

(b) disposing an annular ring-shaped material made of either copper, copper alloys, aluminum, aluminum alloys, zinc, zinc alloys, or nickel, concentrically inside the concavity; and (c) causing a part of the annular ring-shaped material to fill the annular groove(s) and the rest spread as a layer under pressure into the concavity, by means of pressing into the concavity a projection of a semi- or partial-spherical configuration, and forming at the same time a concavity substantially of the semi- or partial-spherical configuration which is closely covered with the matter of the annular material spread into a layer under pressure.

In accordance with the method provided by this invention, an ideal shoe can be readily and economically obtained which is made of a steel base material, inexpensive and superior in strength, being covered with a layer of dissimilar metal having a sufficient thickness, and consequently highly resistant to the high-speed operation, heavy-load, and impact as well as free from the fear of seizure with the ball for a long duration of operation.

BRIEF DESCRIPTION OF THE DRAWINGS

FIG. 1 is a vertical sectional view of a swash-plate type compressor incorporating a shoe which is the object theme of this invention, assumed that the compressor be installed vertically;

FIGS. 2 to 6 are respectively a vertical sectional view of a work processed by each of the steps in an embodiment of this invention;

FIGS. 7 and 8 are respectively a vertical sectional view showing a specific configuration with dimensions of the base material and the annular material for the embodiment illustrated in FIGS. 2 to 6;

FIG. 9 is a vertical sectional view of a shoe concavity of a semi-spherical configuration formed by the use of the base material and the annular material shown in FIGS. 7 and 8;

FIG. 10 is a graph showing the comparison data of the endurance test carried out on a conventional shoe and a shoe of the invention; and FIG. 11 is a similar view to FIG. 4 showing a second embodiment.

DETAILED DESCRIPTION OF THE INVENTION

A brief description of an ordinary compressor including a swash-plate shown in FIG. 1 will be made prior to entering into a detailed illustration of an embodiment of this invention. In FIG. 1 numeral 1 represents a cylinder block, in which a suitable number of bores 2 are formed for slidably accommodating a piston 3. A swash-plate 5 rotating together with a rotary shaft 4 reciprocates the piston 3; and between this swash-plate 5 and the piston 3 are inserted a shoe 6 and a ball 7 for transmitting the motive power from the swash-plate to the piston through the intermediary of the ball and the shoe. This kind of ball and shoe combination in a swash-plate type compressor plays, irrespective of its small size, a very important role at a place requiring great durability, because it is subjected to extremely severe forces when the device operates.

The first step in an embodiment of this invention, shown in FIGS. 2 to 6, is punching a base material 10 from which the shoe (will be made hereinafter simply called base material), from a cold-rolled steel plate which is covered on one surface thereof opposite the side punched, with a sintered metal layer 11 of the copper family. The base material 10 thus punched is of the same general outline, as shown in FIG. 2, as the finished shoe. As shown in FIG. 3, a through bore 12 of small diameter is then made perpendicular to the longitudinal axis of the base material in the central part of the base material 10; next an inverted-conical shaped concavity 13 is cut or machined in the opposite surface from that having the sintered metal layer 11 around an axis running through the center of the base material and normal to the longitudinal axis thereof. In this concavity 13 is further machined an annular groove 14, as shown in FIG. 4, having a section of V-shape; the groove 14 is formed concentrically with and about the middle of the inside of the concavity in the direction of the axis about which the concavity was formed, that is the direction normal to the longitudinal axis of said base material. It is preferable to cut this V-shaped annular groove 14 in an undercut manner relative to the axial direction, from the bottom to the opening of the concavity.

In the base material 10 with the concavity 13, which has been cleaned to be free from dust, oil, and other contaminants, a similarly cleaned material, for forming a covering layer, is provided. The material may take the form of an annular ring piece 15 cut from ordinary copper tubing having a volume a little larger than that of the annular groove 14. The annular ring piece 15 is set over the previously-formed annular groove 14, as shown in FIG. 5.

Next, the base material 10 is firmly held in the outer periphery of a die 30 as shown in FIG. 6. A movable male die 20 with a projection 21 of semi- or partially-spherical configuration is pressed into the concavity 13 by means of a suitable pressure applying apparatus such as a machine press. Due to the pressing of the semi-spherical projection 21 of the male die 20 into the concavity 13, the annular material 15 is first rheologically deformed to so as partially fill the annular groove 14; a further advance of the projection 21 spreads the rest of the annular material 15 into a layer under pressure and at the same time permanently deforms the concavity 13 into a substantially semi-spherical shape covered with a thin layer 17 of copper. In the course of this step a fresh surface, free from oxidation is deposited on the concavity 13. The layer of copper 17 formed in this way partly coats the base material 10 and partly covers the concavity under pressure, that is, firmly adheres to the concavity, and cannot be peeled off under the severe shearing force generated by the sliding movement between the ball 7 and the shoe 6 in the operation of the compressor even under severe pulsation pressure. The shoe formed in this way is knocked out of the die 30 by means of the counterpunch 31.

It is also preferable, in the process of forming the cavity 13 into the spherical surface configuration, to abut the upper surface 16 of the base material 10 to the shouldered portion 22 of the male die 20 simultaneously with the pressing of the semi-spherically shaped projection 21 into the concavity 13. This process is capable of preventing the partial upheaval of the upper surface 16 of the base material 10 at the portion surrounding the spherical concavity, and at the same time advantageously regulates with great precision the amount that the spherical concavity 18 sinks relative to the upper surface 16. A very high degree of preciseness is required in the dimension of the swash-plate and the ball for the swash-plate type compressor; this requirement can be easily satisfied, when the amount the spherical concavity 18 sinks relative to the upper surface 16 is determined with great precision by means of applying a grinding operation on the swash-plate sliding surface, and taking the upper surface 16 as a reference surface, so as to secure the dimensional preciseness or accuracy between the sliding surfaces on the swash-plate side and that on the ball side.

A qualitative disclosure of an embodiment of this invention has been made in the above description. By specifying numerical values for the dimensions of invention, the embodiment will be further specified in a concrete manner hereinafter.

As an example of the base material 10 used in the above process, shown in FIG. 7 a = 18 mm, b = 5 mm, the hardness of the cold-rolled steel plate is about 85 on the Rockwell B scale; the annular material 15, shown in FIG. 8 has dimensions c = 1.4 mm, $d_a$ = 8.0 mm, $d_b$ = 5.7 mm, and is made substantially of pure copper having the hardness of approximately 25 on the Rockwell B scale.

The spherical configuration was formed as set forth above, using the above-mentioned two materials 10 and 15, under the pressure of about 30 tons. Such a large amount of pressure was required because the flat or shouldered portion 22 of the male die 20 had to be pressed against the base material 10, and the semi-spherical force 21 of the male die 20 had to be pressed into the concavity 13; in a simple pressing of the semi-spherical portion 21 a smaller pressure would be sufficient.

FIG. 9, a sketch of a vertical cross-section at the center of the shoe thus fabricated, amplified ten times by means of a projector, will clarify the effects of this method more in detail. Table 1 shows numerically the thickness of the coated layer, in accordance with the measured data at the points of A, B, C, and D in FIG. 9.

TABLE 1

| | Thickness of the coated layer (mm) | | | |
|---|---|---|---|---|
| | A | B | C | D |
| left side | 0.19 | 0.25 | 0.32 | 0.35 |
| right side | 0.12 | 0.20 | 0.41 | 0.25 |

To what extent the inside surface of the concavity 18 was covered by the coated layer 17 and to what extent a part of the coated layer was inlaid deeply into the base material 10 can well be observed. In addition, the whole spherical concavity 18 was in reality not exactly spherical; that part of the spherical cavity near the B position in FIG. 9, that was in contact with the ball 7 is of exactly spherical configuration. By such construction, a good lubrication between the shoe 6 and the ball 7 due to a so-called wedge effect can be expected; in addition, the variation the relative position between the shoe 6 and the ball 7 caused by the wearing of the inside of spherical concavity 18 should be minimized.

The hardness measured for that portion of the spherical concavity 18 which contacted the ball 7 (about 55 on the Rockwell B scale) was much higher than that of the annular material 15 (about 25 on the Rockwell B scale). This seemed to be caused by the work-hardening of the copper itself in the covered layer 17 and the influence of the base material 10 which was closely adhered to the layer 17. This enhanced hardness of the layer 17 was, in addition to the surface roughness thereof, extremely effective in restraining the wear of the same.

Endurance test data, obtained by using a shoe, fabricated by the above described method, and actually mounted in a swash-plate type compressor for an air conditioner in the automotive vehicle under the conditions shown in Table 2, is plotted in FIG. 10 as the curve E.

TABLE 2

| | |
|---|---|
| Number of rotations of the swash-plate | 648 rpm |
| Pressure { suction side | 1.5 – 2.0 Kg/cm$^2$ |
| { discharge side | 27 – 28 Kg/cm$^2$ |
| Amount of lubrication oil | 280 cc (nominal) |
| Sliding speed between the shoe and the ball | up to 0.4 m/sec. |
| The maximum contact pressure between the shoe and the ball | 300 Kg/cm$^2$ |

The number of rotations of the swash-plate per minute, in Table 2, represents the condition in which the vehicle engine was in an idling state, that is, the lowest practical rotation.

The comparison data, shown in FIG. 10 as the curve F, plotted from data obtained from the measurement on a conventional type shoe clearly shows the difference between the two. The F curve indicates extremely rapid wear of the spherical concavity in a short period of time with the conventional type shoe, while the amount of displacement of the ball, in case of the invented shoe, indicates only 6–7 microns of displacement even after a continuous test of 600 hours, which clearly shows the effect of this invention. The fact that the layer 17 had not in the least peeled off the base material 10 after the test of that long, demonstrates the close adhesion of the layer 17 to the base material 10.

Although the above described example is a prefered embodiment of this invention, it does not limit the scope of this invention thereto. Some of the modifications and changes will be described herein by way of examples within the spirit and scope of this invention.

The base material 10 for the shoe is not limited to a cold-rolled steel plate, but any steel member suitable for the forming operation with the semi-spherical projection 21 of the male die may be selected. In the above embodiment a base material, having a layer of sintered metal of the copper family, formed on one surface thereof, opposite the side punched, is punched. The distinguishing feature in this case lies, however, in the formation of the sliding surface of the shoe on the ball side, not on the swash-plate side. Whether the layer of a sintered metal of copper family is used, what the composition of the layer is, and/or what the timing of formation of the sintered metal layer is does not decisively affect the function of the shoe. Even the manufacturing method for the base material is not essential, either.

The previously-formed concavity which was formed into a spherical concavity was in this embodiment an inverted-conical one; it was convenient to start with this shape because the middle portion of this previously-formed concavity was subjected to the greatest permanent deformation; that is to say, the work-hardening took place to the greatest extent at the portion which contacted the ball. The resistance of the concavity to wear was rendered extremely high, and even a relatively small pressure was highly effective in forming a precise spherical concavity. Starting with an approximately partial-spherical previously-formed concavity is, however, also permissible. Any previously-formed concavity, provided that it is axially symmetrical, the diameter of which progressively decreases from the opening portion to the bottom portion, is permissible for this purpose. Even the through bore formed in the central portion of the base material, which is useful not only for facilitating the making of the spherical concavity but also for a passage of the lubricating oil, is not necessarily indispensable.

Machining of the previously-formed concavity is of course preferable because it will provide a coarse surface, without an oxidation film, which is advantageous in obtaining close adhesion between the concavity and the later formed covering layer. Using a mehanical press only, to form the concavity and thereby eliminating the machining process except for the manufacturing of the annular material 15, can be sufficient for the preparation of the shoe.

It is not necessary to separately machine or form the concavity and the annular groove worked within the surface thereof; it is permissible to form both simultaneously. With regard to the shape of the annular groove, an undercut type machining or cutting thereof is shown in FIG. 4 and is useful for allowing the covering material to deeply penetrate therein. A non-undercut type groove may also be used; the covering material will still penetrate therein, because the covering material is pressed into the groove, which is deformed when the spherical concavity is formed, due to the complicated engagement between the covering layer and the base material as shown in FIGS. 7 and 9. It is also possible to make the annular groove U-shaped in section thereof, and to make a plurality of grooves.

It is preferable of course to make the spherical portion and the flat or shouldered portion of the male die press-contact on the base material in the sequence specified in the preferred embodiment, because by using this method the amount the spherical concavity sinks relative to the upper surface of the base material is advantageously determined with high precision; the use of a semi-spherical male die having no flat or shouldered portion is also permissible.

Regarding the method for manufacturing the annular material for forming the covering layer, several other ways than that employed in the preferred embodiment, wherein a tubing is cut are possible, for example, punching a ring from a plate member, bending a wire rod of a certain length into a ring, etc. Copper is the most preferable material, in general, because of its anti-seizure characteristics or ductility. Other metals can also be used, such as brass, bronze and other copper alloys, aluminum, aluminum alloys, zinc, zinc alloys, nickel, etc., so long as they are suitable to be used as a lining material with steel at the portion of the base material that slidingly engages the ball; also important is that the metal should have a suitable hardness for obtaining the preferred thickness in relation to the anti-deformation feature of the base material.

Concerning the thickness of the covering layer some comments will be made: Experiment data teach that an extremely thin layer is liable to be worn and expose the steel of the base material at an initial wearing; a layer below 0.005 mm thickness is impracticable; a thickness of 0.05 mm or more is preferable. On the other hand, a thickness of the layer up to 0.5 mm is desired, but a thickness of 0.3 mm, is unsuitable. Generally speaking, the covering layer functions well, in addition to its own features, when accompanied by some superior mechanical features of the base material such as hardness, tensile strength, etc. An excessively thick layer kills the combined effect of the covering material and the base material, that is, the anti-seizure feature of the former plus the strength of the latter which works through the covered layer.

In this regard it is not preferable that the position where the covering layer is thickest (which is determined by the location of the annular groove before the spherical surface is formed), is the position where the shoe contacts the ball.

To sum up the present invention:

It is a manufacturing method of a shoe for a swash-plate type compressor comprising at least (a) forming an axially symmetrical concavity on one surface of a steel plate, diameters of which progressively decrease, from the opening portion of the concavity toward the bottom portion thereof, and forming at least one annular groove, after the formation of the concavity, on the inside surface of the concavity;

(b) concentrically placing an annular material in the concavity made of either copper, copper alloys, aluminum, aluminum alloys, zinc, zinc alloys, and nickel; and (c) pressing a projection of substantially semi-spherical configuration into the concavity for pressing a part of the annular material into the annular groove and the rest spread under pressure into a layer to cover part of the concavity, thereby forming a substantially spherical concavity having the inside surface thereof closely covered with the spread matter of the annular material.

In accordance with this invention, while using steel, which is inexpensive and strong, as the base material, and covering a spherical concavity made in the steel base material with a layer of a dissimilar or unlike metal, a shoe, highly resistant to wear, and free from seizure with the ball even in case of a shortage of lubrication, and operable for a long time in good stability, can be manufactured economically and speedily.

A male die for forming the spherical concavity, one in which a semi-spherical projection of desired configuration protrudes perpendicularly from a flat or shouldered portion, can be used. The flat portion functions, in conjunction with the formation of the spherical concavity by the semi-spherical protrusion, to abut on the upper portion of the base material for precisely determining the amount the concavity sinks relative to the upper surface, thereby facilitating the maintenance of the accuracy of the dimensions of the sliding surface on the ball side and that on the swash-plate side.

It will be obvious to those skilled in the art that various changes may be made without departing from the scope of the invention and the invention is not to be considered limited to what is shown in the drawings and described in the specification.

What is claimed is:

1. A method for manufacturing a shoe for a swash-plate type compressor comprising:

(a) forming an axially symmetrical concavity on one surface of a base material made of steel, the diameter of the concavity progressively decreasing from the opening portion of said concavity toward the bottom portion thereof, and forming at least one annular groove in said concavity;

(b) concentrically placing, over said groove in said concavity, an annular ring-shaped material made of a metal selected from the group consisting of copper, copper alloys, aluminum, aluminum alloys, zinc, zinc alloys, and nickel; and (c) pressing a substantially partiallyspherical projection into said concavity, causing a part of said annular material to fill said annular groove, and causing a part of the conductivity to become substantially spherical and causing the rest of the annular material to spread under pressure and cover that part of the concavity which is partially spherical.

2. The method in accordance with claim 1, wherein said base material of steel has a sintered metal layer of copper family formed in advance on the opposite surface from the surface on which said concavity is formed.

3. The method in accordance with claim 1, wherein said concavity, the diameter of which being progressively decreases from the opening portion of said concavity toward the bottom portion thereof, is of inverted-conical configuration and has its axis perpendicular to the surface of said base material of steel.

4. The method in accordance with claim 1, wherein said concavity, the diameter of which progressively decreases from the opening portion of said concavity toward the bottom portion thereof, has a substantially partially-spherical concave surface.

5. The method in accordance with claim 1, wherein said concavity, the diameter of which progressively decreases from the opening portion of said concavity toward the bottom portion thereof, is formed by a cutting or machining process.

6. The method in accordance with claim 1, wherein said annular groove is formed in a part of said concavity, the diameter of which progressively decreases from the opening portion of said concavity toward the bottom portion thereof, in an undercut manner relative to the direction from the bottom portion of said concavity toward the opening portion thereof.

7. The method in accordance with claim 1, wherein said annular material is made by cutting a tubing composed of the same material as said annular material to a certain length.

8. The method in accordance with claim 1, wherein said annular material is made by punching a plate composed of the same material as said annular material.

9. The method in accordance with claim 1, wherein said annular material is made by bending a wire rod, cut to a certain length, into a ringshaped form.

10. A method for manufacturing a shoe for a swash-plate type compressor comprising:
(a) forming an axially symmetrical concavity, the diameter of which progressively decreases from the opening portion of said concavity toward the bottom portion thereof, on one surface of a base material composed of steel, and forming at least one annular groove on the surface of said concavity;
(b) concentrically placing, over said groove in said concavity, an annular ring-shaped material made of a metal selected from the group consisting of copper, copper alloys, aluminum, aluminum alloys, zinc, zinc alloys, and nickel; and
(c) pressing a male die having a partially-spherical projection protruding from a flat or shouldered portion into said concavity, and simultaneously abutting said flat portion onto the surface of said base material, composed of steel, around said concavity, thereby causing a part of said annular material to fill said concavity thereby causing it to become substantially spherical and causing the rest of the annular material to spread under pressure into a layer and cover the inside surface of said spherical concavity, wherein the amount said concavity sinks with regard to the top surface of said base material is determined with great precision.

* * * * *